(12) United States Patent
Szilagyi et al.

(10) Patent No.: US 7,884,282 B2
(45) Date of Patent: Feb. 8, 2011

(54) SWELLABLE TAPES AND YARNS TO REPLACE STRAND FILLING COMPOUNDS

(76) Inventors: Randy Szilagyi, 728 McTaggart Place, Weyburn, Sask (CA) S4H 3M6; Mark Kosek, 524 Eleventh St. N.E., Weyburn, SK (CA) S4H 1J8; Sidney Wierstra, 192188 13th Line, R.R. #4, Grand Valley, Ont. (CA) L0N 1G0

(*) Notice: Subject to any disclaimer, the term of this patent is extended or adjusted under 35 U.S.C. 154(b) by 93 days.

(21) Appl. No.: 12/319,545

(22) Filed: Jan. 8, 2009

(65) Prior Publication Data

US 2010/0170693 A1 Jul. 8, 2010

(51) Int. Cl.
*H01B 11/06* (2006.01)
(52) U.S. Cl. .................. 174/36; 174/102 R
(58) Field of Classification Search .......... 174/36, 174/110 R, 110 SR, 110 F, 28, 102 R, 108, 174/105 R
See application file for complete search history.

(56) References Cited

U.S. PATENT DOCUMENTS

| | | | | |
|---|---|---|---|---|
| 4,963,695 A | * | 10/1990 | Marciano-Agostinelli et al. | 174/23 C |
| 5,010,209 A | * | 4/1991 | Marciano-Agostinelli et al. | 174/23 C |
| 5,049,593 A | * | 9/1991 | Marciano-Agostinelli et al. | 523/173 |
| 5,281,757 A | * | 1/1994 | Marin et al. | 174/23 R |
| 5,949,018 A | * | 9/1999 | Esker | 174/23 R |
| 7,157,645 B2 | * | 1/2007 | Huffman | 174/120 R |
| 7,425,676 B2 | * | 9/2008 | Eng | 174/36 |

* cited by examiner

*Primary Examiner*—William H Mayo, III
(74) *Attorney, Agent, or Firm*—Sofer & Haroun, LLP

(57) ABSTRACT

A cable has a conductor and an insulator over the conductor. The conductor includes a first layer of at least one conductor element, a second layer of conductor elements, disposed over the first layer, and an intermediate water blocking layer, between the first and second conductor layers. The intermediate water block layering has at least one longitudinally applied water swellable yarn and at least one helically applied water swellable yarn.

10 Claims, 4 Drawing Sheets

SWELLABLE TAPES AND YARNS TO REPLACE STRAND FILLING COMPOUNDS

FIELD OF THE INVENTION

The present invention relates to power cables. More particularly, the present invention relates to water blocked power cables.

BACKGROUND

Medium voltage power cables (5 kV to 46 kV) must meet various safety standards set by the cable standard organizations. Such standards include AEIC CS 8 (Association of Edison Illuminating Companies), ICEA S-94-649 (Insulated Cable Engineering Association, CSA C68.3 (Canadian Standards Association) and UL 1072 (Underwriters Laboratories)

Additional standards may be applied when these power cables are made water blocked. Such cables must meet additional standards, such as ICEA T-31-610 which is a test for resistance for longitudinal water penetration.

In the prior art "strandblock" has been used to meet these standards. Strandblock is essentially a process whereby a strand filling compound, such as a gel or other water blocking agent is applied between the gaps and spaces between individual elements of a conductor core, blocking the penetration of water. Although many improvements have been made over the years, Strandblock remains a specialized slow and unclean process which is costly and difficult to maintain.

Water swellable powders are a form of polymers that, when brought into contact with water, expand, trapping the water within, forming a water locking gel-like substance. One example of a water swellable powder is formed with polymers that are in the form of polymeric chains coiled, and lined with carboxyl groups. When these water swellable powders are wetted, the carboxyl groups change to be negatively charged, forcing the chains to "uncoil," resulting in a rapidly forming water absorbing gel.

Water swellable powders of this type are commercially available for use in the cable industry. One form for such powders is to be applied to yarns or tapes impregnated with the powders. These yarns and tapes may be applied at various stages during the cable construction.

For example, a typical prior art cable as shown in FIG. 1 includes a cable core of aluminum alloy or copper conductor elements (strands, wires), which are assembled to form a conductor. Around this conductor, a layer of insulating material, such as polyethylene (PE) is applied. In the case of medium and high voltage cables, this layer of insulating material is applied between two layers of semi-conductor material, such as polyolefin with carbon black. The cable may contain other cable components such as metallic screens, armour, jacket etc.

In one prior art arrangement as shown in CA 2 394 846, a water swellable tape is applied around the external copper screen, under the jacket so as to form an improved water blocking structure.

In another prior art arrangement, water blocking yarns may be fashioned for insertion within the conductor itself for use as a water protection measure. However, the simple application of water swellable yarns to a conductor core does not necessarily provide adequate water protection to meet the necessary safety standards such as those met by the strandblock method outlined above.

SUMMARY

The present invention in accordance with various exemplary embodiments described herein, improves upon the prior art solutions by providing a novel water blocking arrangement for power cables, employing a combination of helically wound and longitudinally arranged water blocking yarns in between the conductor elements forming the conductor.

To this end, in accordance with one embodiment, a conductor is provided having a first layer of at least one conductor element and an additional layer or layer of conductor elements. A water blocking layer is arranged between each layer of conductor elements, where the intermediate water blocking layer has at least one longitudinally applied water swellable yarn and at least one helically applied water swellable yarn.

DETAILED DESCRIPTION

Figure 1:
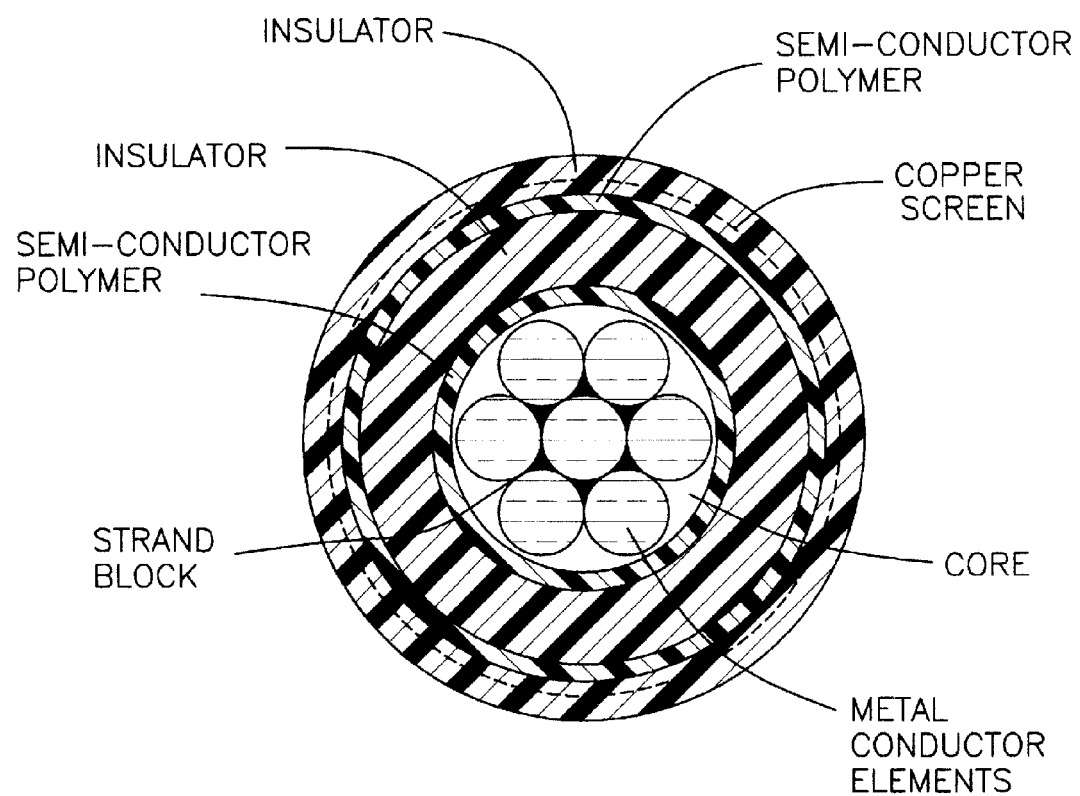
FIG. 1 is a prior art cross section image of a power cable.
Figure 2:
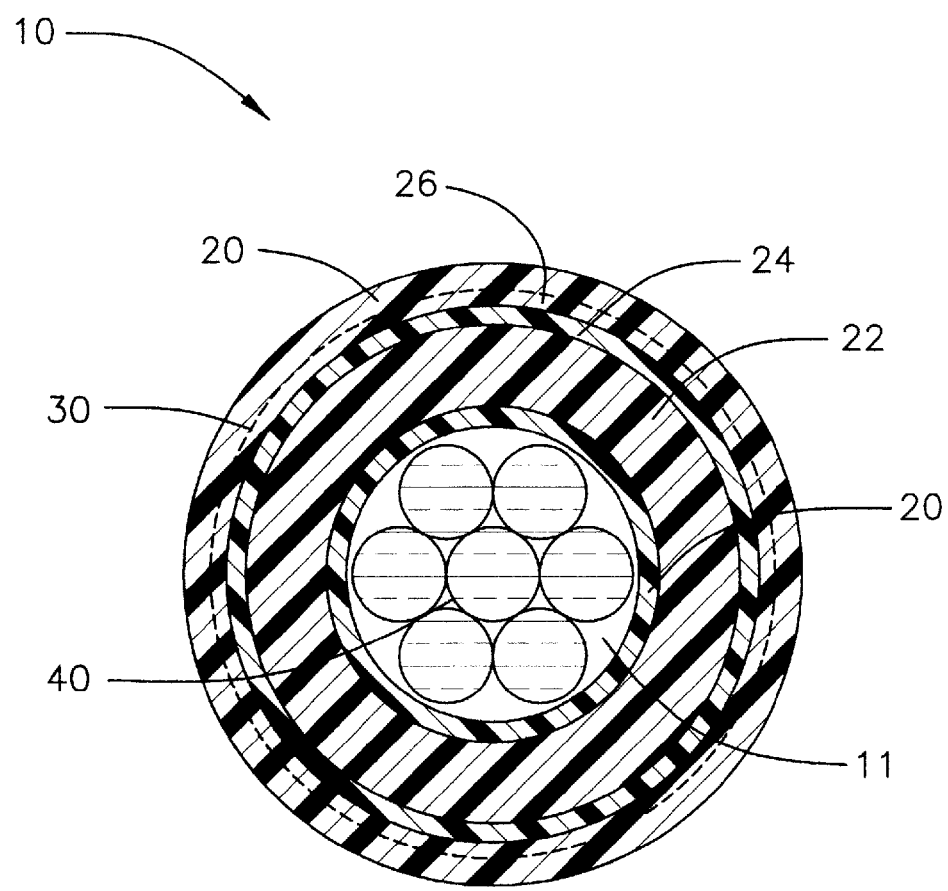
FIG. 2 is a cross section of a power cables constructed according to one embodiment of the present invention.

In one embodiment of the present invention as shown in FIG. 2, a power cable 10 is shown having a conductor core 11 (or conductor), a first semi-conductor layer 20, an insulator layer 22, a second semi-conductor layer 24, a metal shielding 26, and an outer jacket 28. Optionally, a water swellable tape 30 may be applied around metal shielding 26, between shielding 26 and jacket 28. According to one arrangement, a water swellable yarn 40 is applied within conductor core 10 as described in more detail below.

Figure 3:
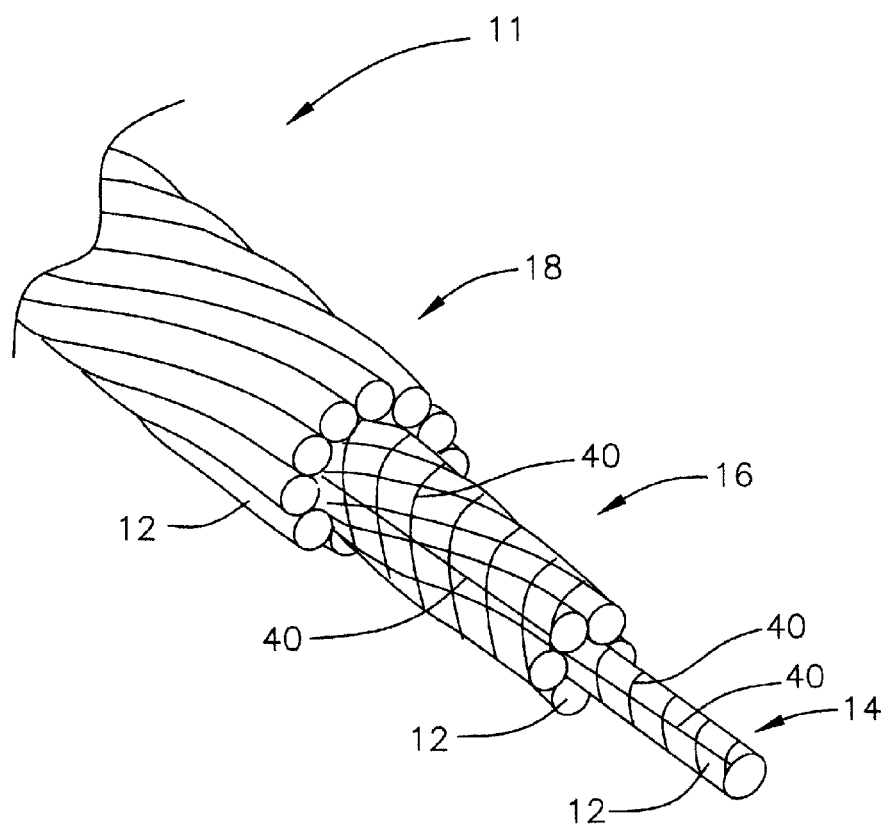
FIG. 3 is close up exploded view of the conductor core of the power cable as shown in FIG. 2.

As shown in FIGS. 2 and 3, Conductor 11 is typically formed of as multi-layer core of conductor elements 12, each element 12 being a metal wire, such as copper wire or aluminum alloy wire. A first layer 14 is formed of a single conductor element 12, with second layer 16 being formed of six conductor elements 12, disposed around the outer circumference of first layer 14. A third layer 18 is formed of additional conductor elements 12 disposed around the outer circumference of second layer 16.

It is understood that various different forms of multi-layer conductors 11 are within the contemplation of the present invention. For the purposes of illustration the three layer conductor 11 shown in FIG. 3 is used to exemplify the salient features of the present invention.

Likewise, it is noted that the arrangement shown is typical for medium voltage power cables. However, it is understood that the features of the present invention may be applied to any cable arrangement.

First semi conductor layer 20, insulator layer 22, and second semi conductor layer 24 form the primary insulation around conductor 11. Typically, semiconductor layers 20 and 24 are made from a semi-conductive polymer, such a PE (Poly ethylene) with embedded carbon black particles. Insulator layer 22 may be formed of PE or other non-conducting polymers suitable for the voltages/current to be carried through cable 10. It is understood that the material/polymer selections for first semi conductor layer 20, insulator layer 22, and second semi conductor layer 24 is by way of example and is in no way intended to limit the scope of the invention.

Metal shielding 26 is preferably a copper screen/mesh used to provide structural integrity to cable 10 as well as to protect against cable damage caused by short circuit currents in cable 10. Metal shield 26 in this capacity acts to equalize electrical stresses around insulation layers 20, 22 and 24.

An optional outer jacket 28 is typically an extruded polymer such as PE used to provide an outer water proof non conductive coating to cable 10. The optional water swellable tape 30 wound around metal shielding 26 under jacket 28 is used to provide added protection against water ingress into the cable and to prevent such water from progressing longitudinally down the length of the cable under jacket 28.

Turning now to the construction of conductor 11 of cable 10, in one embodiment of the present invention, as illustrated in FIG. 3, one or more water swellable yarns 40 are applied helically around each layer of conductor 11. Additionally, one or more water swellable yarns 40 are also applied longitudinally over each layer of conductor elements 12. The outermost layer of conductor elements 12 of conductor 11 may not have a water swellable yarn 40 as it is directly convered by the previously described semi-conductor layer 20.

Thus, yarns 40 are applied both longitudinally and helically around each conductor layer of conductor 11.

In one embodiment of the present invention, water swellable yarn 40 has an average diameter (measured in a hypothetical circular disposition of the yarn) in the range of 0.08" to 0.102". As noted above, water swellable yarn 40 is applied both helically and longitudinally over each conductor element layer. This arrangement provides a distinct advantage when attempting to replace the "standblock" tar used in the prior art, as the combination of helically wound water swellable yarns 40 as well as longitudinally arranged yarns 40 form a robust waterswellable layer that provide not only circumferential water ingress protection but also is effective at filling the interstices between one conductor element layer and the next conductor element layers, particularly in the open areas between the cylindrically shaped conductor elements.

By using the water swellable yarn 40 arrangement as described above, the overall cable 10 diameter may be reduced, relative to a cable employing the standblock technique, making the cable less expensive to produce. Additionally, the equipment necessary for producing the present design is also less costly than the equipment necessary to apply the strandblock compound. Moreover, in addition to cost savings, the water swellable yarns 40 are more robust than the strandblock compound and will return to a rounded (better filling) shape, whereas the strandblcok filler may flatten out under pressure making less effective.

Yet another advantage of the present arrangement, is that water swellbale yarns 40 are more environmentally friendly because they do not require the cleaning solvents needed to maintain a strandblock arrangement. Likewise, the recovery process (i.e. re-use of scrap) of conductors is made significantly easier.

In one arrangement of the present invention, regarding the application of yarns 40, the helically applied portion of water swellable yarns 40 are applied at a rate of substantially 1" to 5" per revolution around a given layer. Such an arrangement gives good water ingress protection while not adversely affecting the conductor element conductivity, such as between the conductor elements in different layers.

Figure 4:
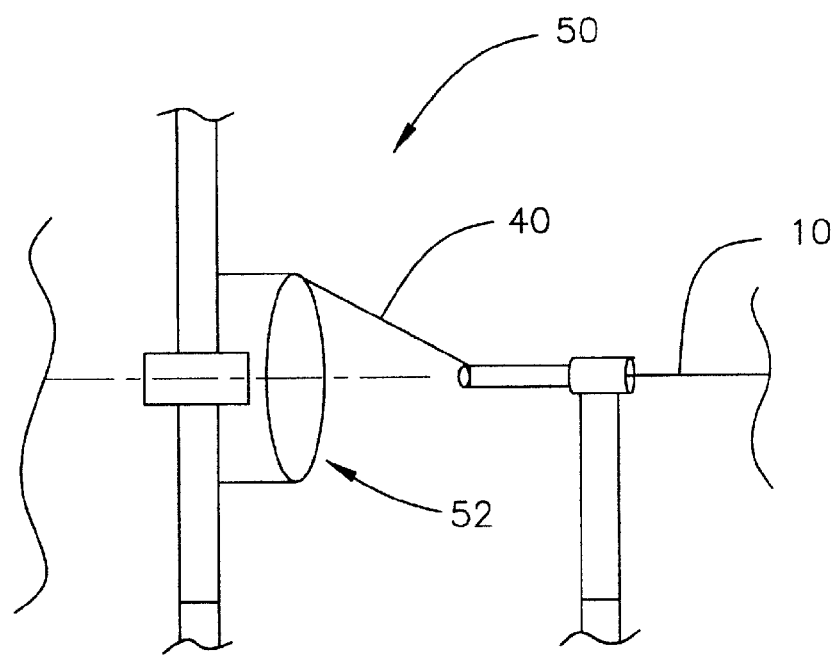
FIG. 4 is an illustration of a device for helically winding the water swellable yarn as shown in FIG. 3.

In one embodiment of the present invention, as shown in FIG. 4, a yarn winding device 52 is utilized in a line production unit 50 to generate core 11 as described above. As shown in FIG. 4, yarn winding device 52 is installed in line production assembly 50 in such a manner and at a location for applying water swellable yarn 40 over a first conductor layer 14, before the application/winding of second layer 16. It is understood that additional winding devices may be employed for additional layers, such as an additional winding device 52 at a point on production assembly line 50 after the application/stranding of second conductor layer 16 and third conductor layer 18.

In one arrangement, the longitudinally applied water swellable yarns 40 may be pulled through line production assembly 10 with their respective conductor elements. For the helically wound yarns 40, winding device 52 operates a rotation speed of approximately 500 revolutions per minute, which operating on line speed of substantially 12 meters per minute to 64 meters per minute, results in the helically winding rate of yarns 40, to fall in the range of 1" to 5" per revolution on their respective conductor layer.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A cable, having a conductor and an insulator over the conductor, said conductor comprising:
    a first layer of at least one conductor element;
    a second layer of conductor elements, disposed over said first layer; and
    an intermediate water blocking layer, between said first and second conductor layers, said intermediate water block layering having at least one longitudinally applied water swellable yarn and at least one helically applied water swellable yarn.

2. The power cable as claimed in claim 1, wherein said conductor elements in said second layer are stranded.

3. The power cable as claimed in claim 1, wherein said first layer is a single conductor element.

4. The power cable as claimed in claim 1, wherein said insulator is formed of a first semi-conducive layer, an insulator and a second semiconductive layer.

5. The power cable as claimed in claim 1, further comprising a metal shielding on said insulator.

6. The power cable as claimed in claim 5, further comprising an outer jacket disposed over said metal shielding.

7. The power cable as claimed in claim 1, wherein said helically applied water swellable yarn of said water swellable layer is applied at substantially 500 rpm over a conductor element line speed of between substantially 12 meters per minute and 64 meters per minute.

8. The power cable as claimed in claim 1, wherein said helically applied water swellable yarn of said waterswellable layer is applied at substantially 1" to 5" of conducter layer length per revoulation.

9. The power cable as claimed in claim 1, further comprising a third layer of conducter elements over said second layer of conductor elements, said cable further having a second intermediate water blocking layer, between said second and third conductor layers, said a second intermediate water blocking layer having at least one longitudinally applied water swellable yarn and at least one helically applied water swellable yarn.

10. A method of making a cable, said method comprising the steps of:
arranging a first layer of at least one conductor element;
applying a second layer of conductor elements over said first layer; and
applying an intermediate water blocking layer between said first and second conductor layers, said step of applying an intermediate water block layer including arranging at least one longitudinally applied water swellable yarn with said first layer of conductor elements and helically winding at least one water swellable yarn over said first layer of conductor elements.

* * * * *